(12) United States Patent
Kashiwagi et al.

(10) Patent No.: US 8,891,169 B2
(45) Date of Patent: Nov. 18, 2014

(54) OPTICAL SHEET AND DISPLAY DEVICE

(75) Inventors: Tsuyoshi Kashiwagi, Tokyo (JP);
Tetsuya Sadahiro, Tokyo (JP);
Hiroyuki Amemiya, Tokyo (JP);
Nobuhiko Ichikawa, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 885 days.

(21) Appl. No.: 13/063,986

(22) PCT Filed: Sep. 17, 2009

(86) PCT No.: PCT/JP2009/066299
§ 371 (c)(1),
(2), (4) Date: May 25, 2011

(87) PCT Pub. No.: WO2010/032801
PCT Pub. Date: Mar. 25, 2010

(65) Prior Publication Data
US 2011/0216416 A1    Sep. 8, 2011

(30) Foreign Application Priority Data
Sep. 17, 2008    (JP) ................. 2008-237974

(51) Int. Cl.
*G02B 5/04* (2006.01)
*G02B 5/02* (2006.01)
*B32B 27/36* (2006.01)
*G02B 5/00* (2006.01)
*G03B 21/62* (2014.01)

(52) U.S. Cl.
CPC ............. *G02B 5/045* (2013.01); *B32B 27/36* (2013.01); *G02B 5/003* (2013.01); *G02B 5/0242* (2013.01); *G02B 5/0278* (2013.01); *G03B 21/62* (2013.01)

USPC .......................................... 359/599; 359/614

(58) Field of Classification Search
CPC ............ G02B 5/02–5/0294; G02B 5/04–5/045
USPC ..................... 359/599, 609, 613–614, 485.06, 359/489.09, 606, 625, 638, 640, 831–837
See application file for complete search history.

(56) References Cited

U.S. PATENT DOCUMENTS 6,822,792 B2 * 11/2004 Goto ............................. 359/456
2003/0174396 A1 * 9/2003 Murayama et al. ........... 359/453
(Continued)

FOREIGN PATENT DOCUMENTS

JP    2000-347008 A    12/2000
JP    2003-504691 T    2/2003
(Continued)

OTHER PUBLICATIONS

International Search Report: PCT/JP2009/066299 mailed Oct. 27, 2009.

*Primary Examiner* — Stephone B Allen
*Assistant Examiner* — Jeffrey Madonna
(74) *Attorney, Agent, or Firm* — Ladas & Parry LLP

(57) ABSTRACT

Provided is an optical sheet hardly causing a change in color depending on the observation angle of an image, the optical sheet including a plurality of layers, at least one of the layers being an optical functional sheet layer including prisms arranged in parallel along a surface of the optical sheet such that light is transmittable; and light-absorbing portions arranged in parallel between the prisms in a way to absorb light, at least another one of the layers being a light diffusing material-containing layer with optical diffusing particles dispersed in a base material, and the optical sheet satisfying a relation of $Nd_K < Nd_R$ and $vd_K < vd_R$, wherein $Nd_K$ is a refractive index of the base material of the light diffusing material-containing layer, $vd_K$ is an Abbe number thereof, NdR is a refractive index of the optical diffusing particles and $vd_R$ is an Abbe number thereof.

15 Claims, 11 Drawing Sheets

(56) References Cited

U.S. PATENT DOCUMENTS

| | | | |
|---|---|---|---|
| 2004/0160669 A1* | 8/2004 | Osawa et al. | 359/460 |
| 2005/0237611 A1* | 10/2005 | Osawa et al. | 359/460 |
| 2005/0280893 A1* | 12/2005 | Baba et al. | 359/457 |
| 2006/0139749 A1* | 6/2006 | Watanabe et al. | 359/460 |
| 2006/0176562 A1* | 8/2006 | Goto | 359/599 |
| 2007/0257591 A1* | 11/2007 | Park et al. | 313/112 |

FOREIGN PATENT DOCUMENTS

| | | | |
|---|---|---|---|
| JP | 2004-110002 A | | 4/2004 |
| JP | 2004-151592 A | | 5/2004 |
| JP | WO2007/001013 | * | 1/2007 |
| JP | WO2008/072626 | * | 6/2008 |
| JP | 2008-151854 A | | 7/2008 |
| WO | 01/04701 A1 | | 1/2001 |

* cited by examiner

OPTICAL SHEET AND DISPLAY DEVICE

TECHNICAL FIELD

The present invention relates to an optical sheet which controls image light emitted from an image source and emits the light to the observer side and relates to a display device. Particularly, the invention relates to an optical sheet capable of reducing a change in color depending on the angle for observing image light, and a display device.

BACKGROUND ART

A display device which emits an image to an observer, such as a liquid crystal display, a plasma display, a rear projection, an organic EL, or an FED, includes an image source and an optical sheet including a layer having various functions for improving the quality of image light from the image source and emitting the light to the observer.

An example of the optical sheet is disclosed in Patent Document 1. The optical sheet described in Patent Document 1 has portions for transmitting image light and a triangular structure disposed therebetween. Then, the sheet reflects image light at an interface between the portions for transmitting image light and the triangular structure to disperse the light. This configuration can allow the image light to be dispersed at a large angle.

CITATION LIST

Patent Documents

Patent Document 1: Published Japanese Translation of PCT Application No. 2003-504691

SUMMARY OF THE INVENTION

Problem to be Solved by the Invention

However, when a display device was operated with the optical sheet described in Patent Document 1 and the conventional optical sheets being used for the display device, its color looked different depending on the angle for observing an image in some cases. It has been necessary to improve a change in color depending on the angle for observing an image from the viewpoint of providing higher quality image light.

In view of the problem, an object of the present invention is to provide an optical sheet and a display device which do not easily cause a change in color depending on the angle for observing an image.

Hereinafter, the present invention will be described. For ease of understanding the invention, the reference numerals in the accompanying drawings are given in parenthesis, which by no means limit the invention to the illustrated embodiments.

As a result of a dedicated study, the inventors has found out that one of the causes of a change in color depending on the angle for observing an image is wavelength dispersion of light occurred when the light is refracted. The inventors have completed the following invention based on the finding.

To solve the problem, the first aspect of the present invention provides an optical sheet (10) comprising:
a plurality of layers,
at least one of the plurality of layers being an optical functional sheet layer (12) which includes: prisms (13, 13, ...) arranged in parallel along a surface of the optical sheet in such a way that light is transmittable; and light-absorbing portions (14, 14, ...) arranged in parallel between the prisms in such a way as to absorb light, at least another one of the layers being a light diffusing material-containing layer (18) with optical diffusing particles dispersed in a sheet-shaped base material, and the optical sheet satisfying a relation of $Nd_K < Nd_R$ and $vd_K < vd_R$, wherein $Nd_K$ is a refractive index of the base material of the light diffusing material-containing layer and $vd_K$ is an Abbe number thereof, $Nd_R$ is a refractive index of the optical diffusing particles and $vd_R$ is an Abbe number thereof.

Here, the refractive index Nd and the Abbe number vd are values represented by: $vd = (Nd-1)/(Nf-Nc)$,
wherein Nf is a refractive index at a wavelength of 486.1 nm (f line), Nd is a refractive index at a wavelength of 589.2 nm (d line), and Nc is a refractive index at a wavelength of 656.3 nm (c line). Therefore, when the Abbe number is larger, the wavelength-originated dispersion is controlled to be smaller; when the Abbe number is smaller, the wavelength-originated dispersion is larger.

The wording "prisms are arranged in parallel along the sheet surface" is not limited to the arrangement of the prisms in parallel along one direction of the sheet face, and represents the concept that the prisms should be arranged along the sheet face in accordance with a predetermined principle. Therefore, for example, it may be obliquely arranged along the sheet face or may be arranged in a zigzag pattern.

The second aspect of the present invention provides the optical sheet (10) according to claim 1, wherein a difference between the refractive indices $Nd_R$ and $Nd_R$ is 0.02 or more and 0.06 or less.

The third aspect of the present invention provides the optical sheet (10) according to the first or second aspect of the invention, wherein a difference between the Abbe numbers $vd_R$ and $vd_R$ is 10 or more and 30 or less.

The fourth aspect of the present invention provides the optical sheet (10) according to any one of the first to third aspects of the invention, wherein an average diameter of the optical diffusing particles contained in the light diffusing material-containing layer (18) is 4 μm or more and 16 μm or less Here, the term "average diameter" of the particles means a diameter which is obtained by targeting particles having a diameter within in a range of ±0.5 μm relative to the average particle diameter when measuring the particle size using a weight distribution method and of which standard deviation is 0.3 or more in particle size distribution.

The fifth aspect of the present invention provides the optical sheet (10) according to any one of the first to fourth aspects of the invention, wherein the base material of the light diffusing material-containing layer (18) is made of an organic material and the optical diffusing particles are formed of an inorganic material.

The sixth aspect of the present invention provides the optical sheet (10) according to any one of the first to fifth aspects of the invention, wherein a binder (15, 15, ...) made of resin is filled in the light-absorbing portion (14, 14, ...) of the optical functional sheet layer and light absorbing particles (16, 16, ...) having an average diameter of 1 μm are dispersed in the binder.

The expression "average (particle) diameter is 1 μm" in the phrase "an average (particle) diameter of 1 μm or more" is targeted on a particle having a diameter of 0.5 μm or more and less than 1.5 μm when measuring the particle size using the weight distribution method, and the standard deviation is 0.3 or more in particle size distribution. In the following description, it is the same.

The seventh aspect of the present invention provides the optical sheet according to anyone of the first to sixth aspects of the invention, wherein the prisms of the optical functional sheet layer and the light-absorbing portion are formed to extend in a longitudinal direction while maintaining a predetermined cross section, two of the optical functional sheet layers are laminated so that a longitudinal direction of the light-absorbing portion of one of the optical functional sheet layers of the two optical functional sheet layers and a longitudinal direction of the light-absorbing portion of the other optical functional sheet layer of the two optical functional sheet layers have a predetermined angle.

The eighth aspect of the present invention provides the optical sheet according to the seventh aspect of the invention, wherein the predetermined angle is 90 degrees.

The nineth aspect of the present invention provides the optical sheet according to any one of the first to sixth aspects of the invention, wherein the light-absorbing portion of the optical functional sheet layer is formed into a shape of lattices crossing at a predetermined angle.

The 10th aspect of the present invention provides the optical sheet according to the nineth aspect of the invention, wherein the predetermined angle is 90 degrees.

The 11th aspect of the present invention provides the optical sheet (10) according to any one of the first to 10th aspects of the invention, wherein the plurality of layers includes at least one of a base material layer (11) to be used as a base layer of the optical functional sheet layer, an adhesive layer (17), an antiglare film layer (20), and a TAC film layer (19), in addition to the optical functional sheet layer (12) and the light diffusing material-containing layer (18).

Here, the term "anti-glare" means "anti-dazzle".

The 12th aspect of the present invention provides the optical sheet (10) according to any one of the first to 11th aspects of the invention, wherein the plurality of layers include an anti-glare film layer (20) in addition to the optical functional sheet layer (12) and the light diffusing material-containing layer (18), and the light diffusing material-containing layer is provided between the optical functional sheet layer and the antiglare film layer.

The 13th aspect of the present invention provides the optical sheet according to any one of the first to 11th aspects of the invention, wherein the light diffusing material-containing layer has an anti-glare function.

The 14th aspect of the present invention provides a display device including the optical sheet according to any one of the first to 13th aspects of the invention.

Effect of the Invention

A change in color depending on the angle for observing an image can be controlled by the optical sheet of the present invention and the display device having the optical sheet.

DESCRIPTION OF REFERENCE NUMERALS

Figure 1:
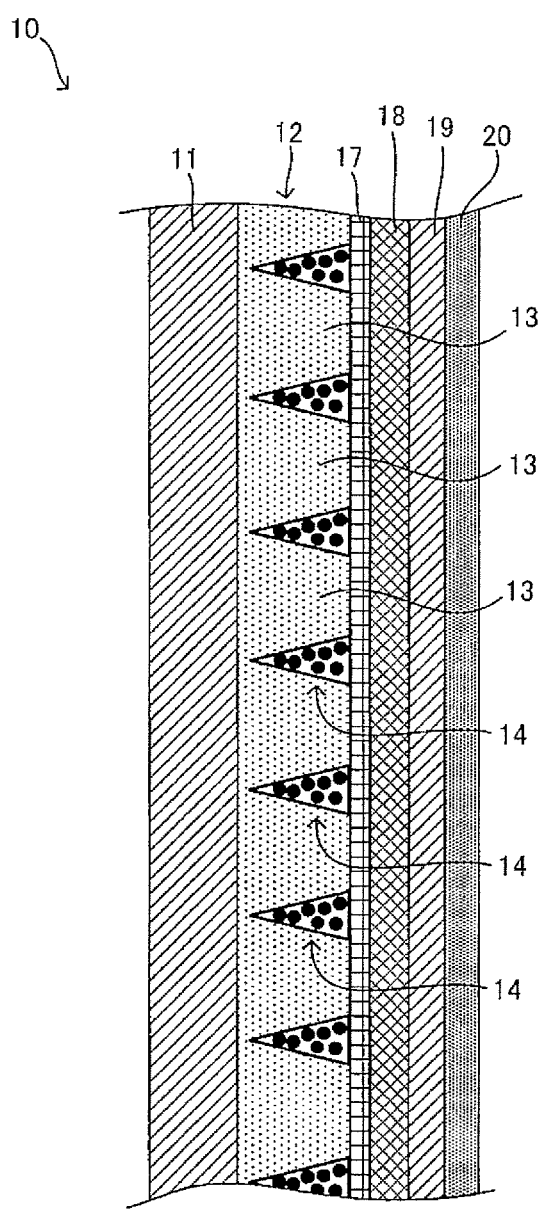
FIG. 1 is a cross-sectional view of an optical sheet according to the first embodiment schematically showing the layer structure of the optical sheet.

1 Image source unit
2 Backlight (image source)
3 Polarizing plate
4 Liquid crystal panel (image source)
5 Polarizing plate
6 Adhesive layer
10 Optical sheet
11 PET (polyethylene terephthalate) film layer (base material layer)
12 Optical functional sheet layer
13 Prism
14 Light absorbing portion
15 Binder portion
16 Light absorbing particle
17 Adhesive layer
18 Light diffusing material-containing layer
19 TAC (triacetylcellulose) film layer
20 AG (anti-glare) layer

BEST MODES FOR CARRYING OUT THE INVENTION

The aforementioned functions and benefits of the present invention will be apparent from the following best modes for carrying out the invention. Hereinafter, the present invention will be described based on embodiments shown in the drawings. However, the present invention is not limited to the embodiments.

FIG. 1 shows the cross section of an optical sheet 10 according to the first embodiment and schematically shows the layer structure of the optical sheet. The optical sheet 10 includes a PET film layer 11, an optical functional sheet layer 12, an adhesive layer 17, a light diffusing material-containing layer 18, a TAO film layer 19, and an anti-glare film layer (AG layer) 20. These layers extend on the front-to-back direction of the drawing sheet while maintaining the cross section shown in FIG. 1. Hereinafter, each layer will be described. In the drawings shown below, some repeated reference numerals will not be described for viewability.

The PET film layer 11 is a film layer as a base material layer to be used as a base to form the optical functional sheet layer 12 on one face of the PET film layer 11, and is formed of polyethylene terephthalate (PET) as a main component. As long as the PET film layer 11 contains PET as a main component, it may contain other resins. Here, the term "main component" means 50% by mass or more based on the total mass of the PET film layer. Various additives may be added thereto. Examples of conventional additives include phenol-type antioxidants and lactone-type stabilizers.

Although the PET film layer has been described as a base material layer herein, the base material layer is not necessarily formed of PET; a "polyester-based resin" such as polybutylene terephthalate resin (PBT) and polytrimethylene terephthalate resin (PTT) may be used. In the present embodiment, in view of mass productivity, cost, availability, and so on in addition of performance, a resin mainly containing polyethylene terephthalate (PET) is preferably used as the material of the base material layer.

Figure 2:
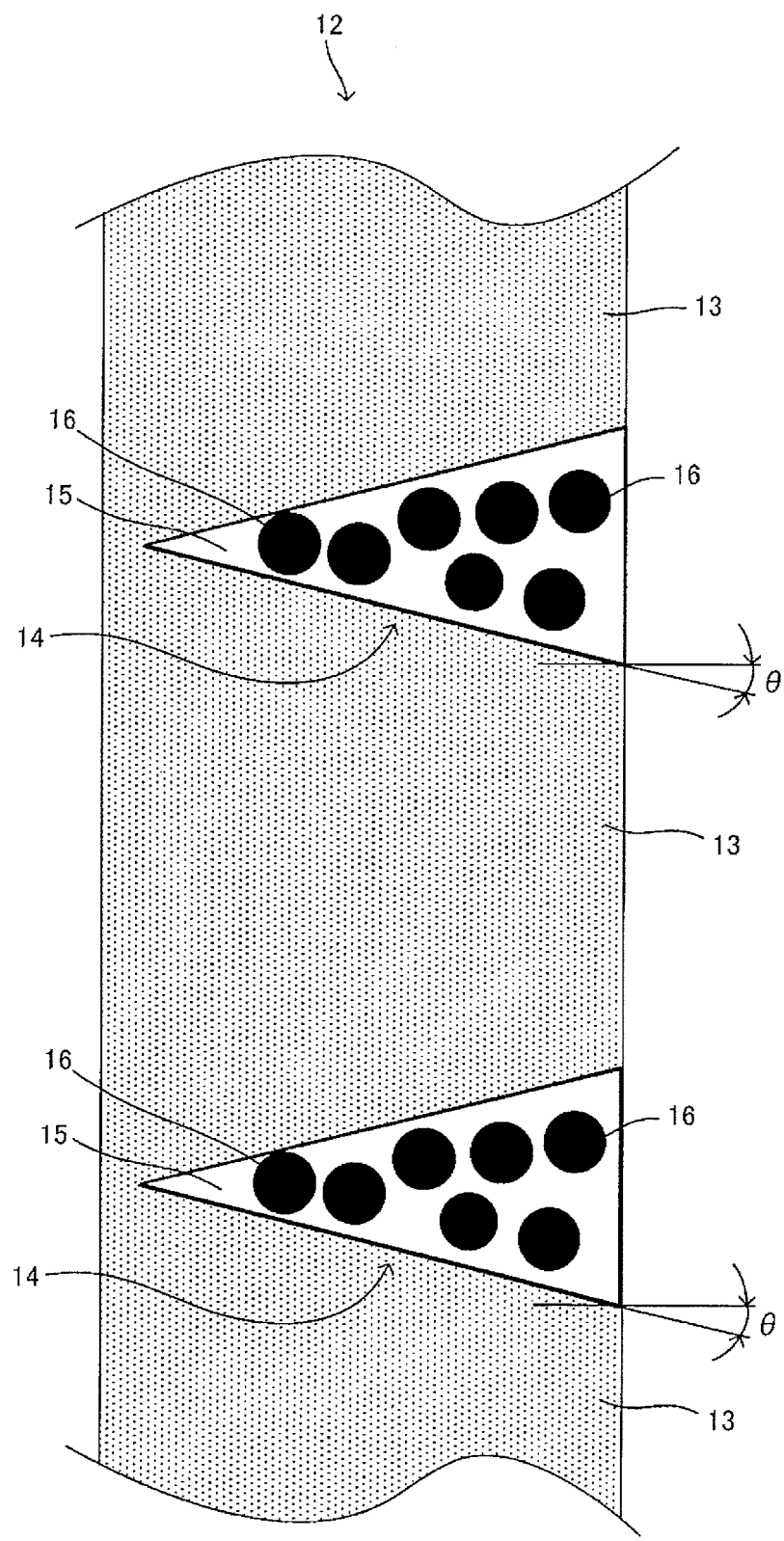
FIG. 2 is a partially enlarged view of an optical functional sheet layer of the optical sheet shown in FIG. 1.

The optical functional sheet layer 12 includes prisms 13, 13, which have a substantially trapezoidal cross section in the thickness direction of the sheet and light-absorbing portions 14, 14, . . . disposed between the prisms 13, 13, . . . . FIG. 2 is an enlarged view focusing on the two light-absorbing portions 14, 14 and the prisms 13, 13, 13 adjacent to the light-absorbing portions 14, 14. The optical functional sheet layer 12 will be described with reference to FIGS. 1 and 2.

The prisms 13, 13, . . . are elements, each of which has a substantially trapezoidal cross section whose lower base is located on one side of the PET film layer 11, and upper base is located on the other side thereof. The prisms 13, 13, . . . are respectively formed of a light transmissive resin with a refractive index $N_p$. This is usually formed of, for example, epoxy acrylate characterized by being cured by ionizing radiation, ultraviolet or the like. The magnitude of $N_p$ is not specifically limited; however, in terms of availability of the material, the magnitude is preferably from 1.49 to 1.56. As image light transmits through the prisms 13, 13, . . . , the image light is provided to the observer.

The light-absorbing portions 14, 14, . . . are provided between the prisms 13, 13, . . . . Each light-absorbing portion 14, 14, has a substantially triangular cross-section whose lower base corresponds to the upper base of the prism 13, 13, . . . , and apex facing the lower base corresponds to the lower base of the prism 13, 13, . . . . Each light-absorbing portion 14, 14, includes binder portions 15 filled with a material with a refractive index $N_B$ and light absorbing particles 16, 16, . . . mixed in the binder portion 15, 15, . . . . When external light enters and is absorbed by the light-absorbing portion 14, 14, . . . , influences of external light on image light can be reduced and the contrast of an image can be improved.

A binder material filled in the binder portion 15, 15, . . . is formed of a material with a refractive index $N_B$. The magnitude of $N_B$ is not specifically limited; however, in terms of availability of the material, the magnitude is preferably from 1.49 to 1.56. Although a material used as the binder material is not particularly limited; for example, urethane acrylate characterized by being cured by ionizing radiation, ultraviolet or the like can be used.

Here, the difference between the refractive index $N_p$ of the prisms 13 and the refractive index $N_g$ of the binder portions 15 (the difference between the refractive indexes $N_P$ and $N_B$) is preferably larger than 0 and less than 0.10. Thus, the total reflection is suitably performed at the interface between the prism 13, 13, . . . and the light-absorbing portion 14, 14, . . . , and incident stray light and external light can be absorbed by the light-absorbing portion 14, 14, . . . .

The average diameter of the light absorbing particles 16, 16, . . . is preferably 1 μm or more in view of availability and production. The light absorbing particles 16, 16, . . . are colored at a predetermined density by a pigment such as carbon powder or a dye in red, blue, or yellow. The light absorbing particles 16, 16, . . . may be colored by commercially available colored resin particles. The refractive index of the light absorbing particles 16, 16, is not specifically limited.

Although the light absorption performance of the light-absorbing portions 14, 14, can be suitably adjusted according to the purposes, the light-absorbing portion is preferably configured to show a light absorption performance having a transmittance of 40 to 70% when measuring the transmittance of a 6 μm thick optical sheet made only of materials for forming the light-absorbing portion. Although the means for attaining the transmittance of 40 to 70% is not particularly limited, it may include the adjustment of the content of light absorbing particles and the light absorption performance.

An angle θ of the oblique sides (two sides extending in the sheet thickness direction) of the light-absorbing portions 14, 14, . . . with respect to the normal line of the sheet face may be changed according to the purposes and is not specifically limited. However, in the optical sheet 10 of the present embodiment, the angle preferably ranges from 6° to 15° in terms of suitable reflection/absorption of both external light and image light.

In the optical functional sheet layer 12, as shown in FIGS. 1 and 2, the prisms 13, 13, . . . have a substantially trapezoidal cross section and the light-absorbing portions 14, 14, . . . formed between the prisms have a triangular cross section. However, as long as light can be suitably controlled, those shapes are not specifically limited, and other appropriate shapes are used as needed. For example, the light-absorbing portion may have a trapezoidal cross section in place of the triangular cross section. The oblique side to form the interface between the prism and the light-absorbing portion may be in a polygonal line or a curved line.

The adhesive layer 17 is a layer on which an adhesive is placed to adhere the optical functional sheet layer 12 to the light diffusing material-containing layer 18. The adhesive used in the adhesive layer 17 transmits light therethrough, and is not particularly limited as long as the adhesive can suitably bond the optical functional sheet layer 12 to other components. For example, a pressure sensitive adhesive (PSA) may be used. The viscosity is, for example, approximately several N/25 mm to 20N/25 mm.

The light diffusing material-containing layer 18 is a layer formed of a translucent sheet-shaped base material and optical diffusing particles dispersed in the base material. The base material is a light transmittable material and is formed so as to have a predetermined refractive index $Nd_K$ and a predetermined Abbe number $vd_K$. Here, the refractive index Nd and the Abbe number vd are values represented by vd=(Nd−1)/(Nf−Nc), wherein Nf is a refractive index at a wavelength of 486.1 nm (f line), Nd is a refractive index at a wavelength of 589.2 nm (d line), and Nc is a refractive index at a wavelength of 656.3 nm (c line). The same holds for the optical diffusing particles to be described below.

On the other hand, the optical diffusing particles are a particle-shaped material dispersed in the base material and have a refractive index $Nd_R$ and an Abbe number $vd_R$.

Here, the refractive index $Nd_K$ of the base material and the Abbe number $vd_K$ as well as the refractive index $Nd_R$ of the optical diffusing particles and the Abbe number $vd_R$ have a relation of $Nd_K < Nd_R$ and $vd_K < vd_R$. Thus, light is diffused while controlling wavelength dispersion, so that the change in color depending on the angle for observing an image can be suppressed. The reason why the change in color can be thus suppressed will be described in detail later.

That is, firstly, the refractive index $Nd_R$ of the optical diffusing particles is larger than the refractive index $Nd_K$ of the base material. The difference is preferably from 0.02 to 0.06. When the refractive index difference is smaller than 0.02, an optical diffusion effect is small. Therefore, many optical diffusing particles need to be added, which is not preferable from the viewpoint of economical reason and production process. On the other hand, when the refractive index difference is larger than 0.06, the optical diffusion effect is large. However, this decreases the number of optical diffusing particles for obtaining a predetermined light diffusing characteristic, which causes glare (scintillation). More preferably, the refractive index difference is about 0.03.

Secondly, the Abbe number $vd_R$ of the optical diffusing particles is larger than the Abbe number $vd_K$ of the base material. Thus, the wavelength dependency, in which the diffusion of blue light with a short wavelength caused by the refractive index difference between the optical diffusing particles and the base material is stronger than the diffusion of red light with a long wavelength, can be suppressed. As a result, a change in color depending on the angle for observing an image can be suppressed as described later. It is preferable that the difference of the Abbe number is as large as possible. Specifically, it is preferable that the difference is 10 or more. Taking into consideration that the base material and the optical diffusing particles have the relation of refractive index and have the Abbe number which satisfies the condition, it is more preferable that the difference is about 30 from the viewpoint of general availability and ensuring versatility.

The combination of the base material configured to form the light diffusing material-containing layer 18 and the optical diffusing particles is not particularly limited as long as the above-described relation is satisfied. However, generally, when a resin such as the so-called acrylic/styrene resin (organic material) is used, the Abbe number tends to become smaller when the refractive index becomes larger. When the resin is formed into the optical diffusing particles, it may not satisfy the above-described condition. On the other hand, the relation may be often satisfied by using an inorganic material. Thus, the above-described relation can be easily satisfied by using inorganic material for the optical diffusing particles. Examples of the inorganic material include various oxides and nitrides, such as silica, alumina, zirconia, and silicon nitride. In addition, the inorganic material may be a diamond. Among them, glass beads can be preferably used from the viewpoint of easy availability of glass beads having various refractive indexes and Abbe numbers.

On the other hand, the base material is preferably an organic material, particularly a resin material from the viewpoint of easiness of forming into a film shape, handling, and adhesiveness. Examples thereof include an acrylate resin, a styrene resin, and an acrylic styrene resin. For example, an acrylate resin having a refractive index of 1.49 and an Abbe number of 50 is available as the base material and glass having a refractive index of 1.52 and an Abbe number of 60 is available as the optical diffusing particles. When using these, the refractive index difference can be set to 0.03 and the difference of the Abbe number can be set to 10.

The content of the optical diffusing particles in the base material is not particularly limited. It is preferable that the optical diffusing particles are added at a rate of 5 to 20 parts by mass (sometimes referred to as "5 to 20 parts") based on 100 parts by mass of the base material. More preferably, the rate is from 10 to 15 parts by mass (10 to 15 parts). The haze value is not particularly limited, and it preferably ranges from 10 to 30.

The optical diffusing particles are not particularly limited as long as they have the above-described characteristics. From the viewpoint of further improving diffusibility, it is preferable that the optical diffusing particles have a spherical shape. The average particle diameter thereof is preferably 16 μm or less. This is because when the average particle diameter is larger than 16 μm, which may cause "glare (scintillation)". More preferably, the average particle diameter is from 4 to 16 μm. This is because when the average particle diameter is smaller than 4 μm, the behavior of light dispersion may change (e.g. Mie scattering).

The TAC film layer 19 is formed of triacetyl cellulose and is used as a protective film. As a TAC film to be used for the TAC film layer 19, a TAC film to be used for a conventional liquid crystal display panel unit can be used.

An AG layer 20 is a film (anti-glare film) capable of preventing glare on a screen when the observer views the screen. As the AG film, a conventionally available anti-glare film can be used. In the present embodiment, the AG layer is used; however, an AR layer may be disposed in place of the AG layer. The term "AR layer" means an "anti-reflection layer" and can prevent reflection.

In the present embodiment, the light diffusing material-containing layer 18 and the AG layer 20 are separately provided. Alternatively, for example, when the light diffusing material-containing layer is disposed at the position of the AG layer 20 and the light diffusing material-containing layer is made to have a mat face (recess-protrusion surface), the layer can be provided with an anti-glare function. As a result of this configuration, a single layer can be provided with the functions of the light diffusing material-containing layer and the AG layer.

Figure 3:
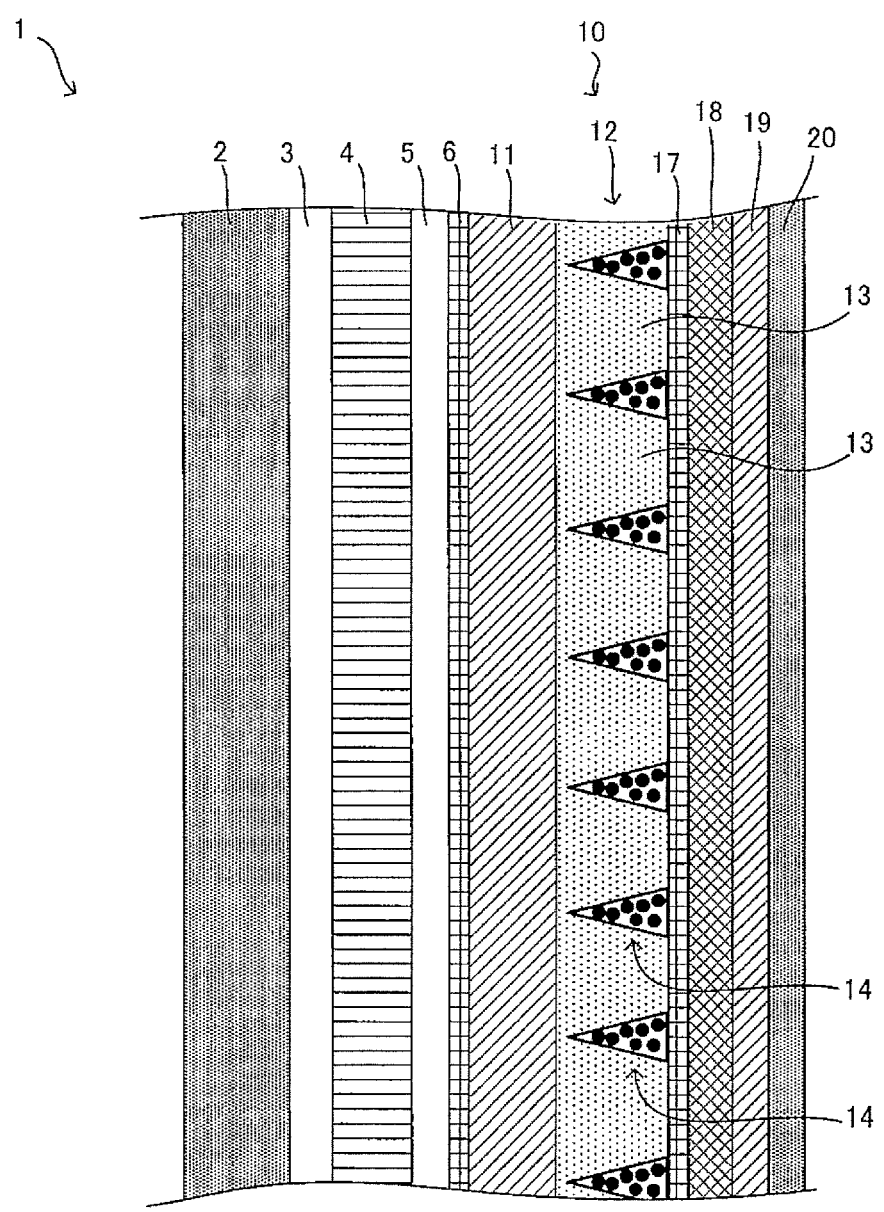
FIG. 3 is a cross-sectional view of an image source unit of a display device having the optical sheet shown in FIG. 1 and schematically shows the layer structure of the image source unit.
Figure 4:
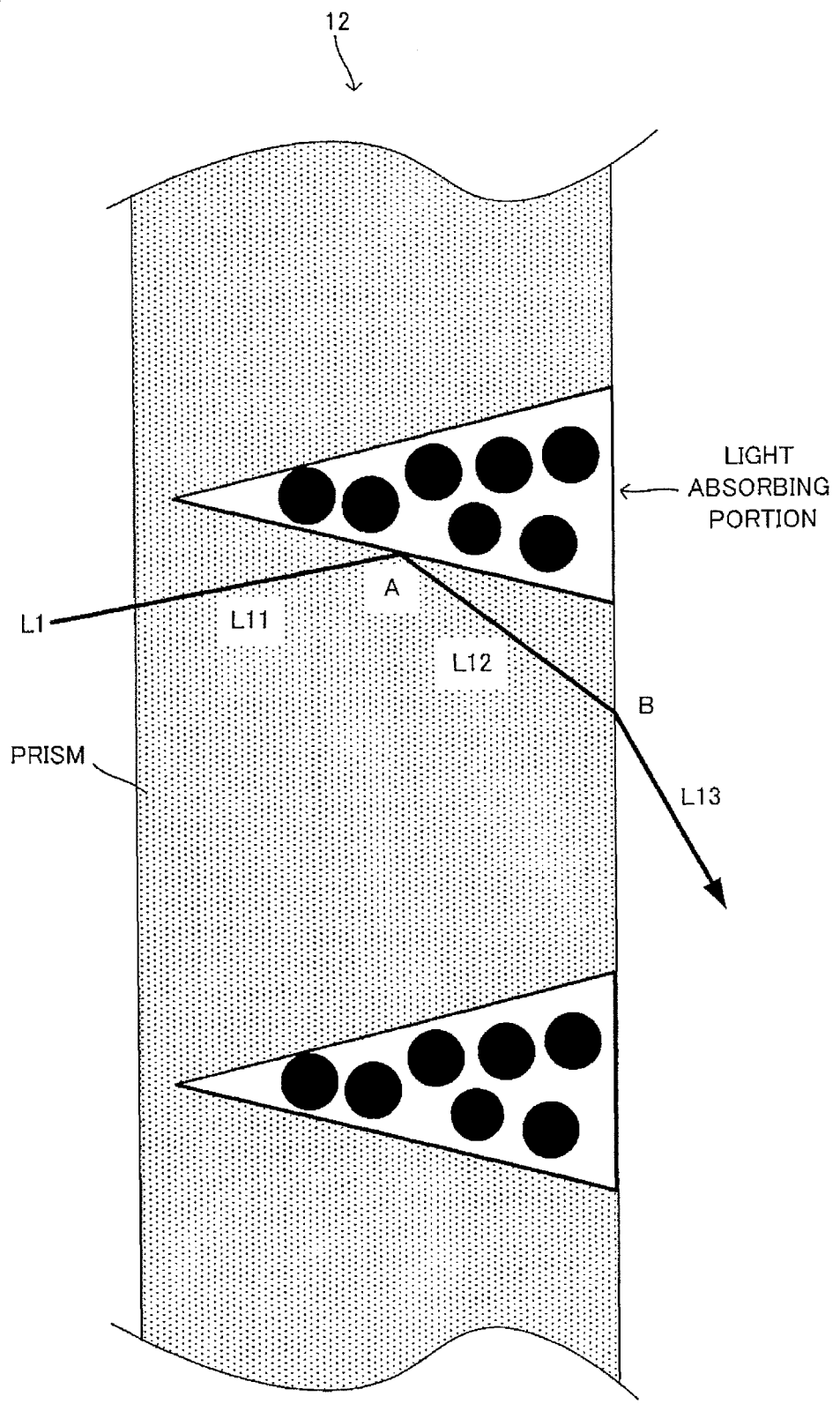
FIG. 4 is a view for illustrating an optical sheet which does not have a light diffusing material-containing layer.

Next, the display device having the optical sheet 10 will be described. FIG. 3 is a view showing the cross section of an image source unit 1 of the display device and schematically showing the layer structure of the image source unit. The right side of FIG. 4 is the observer side. The display device in the present embodiment is a liquid crystal display, and the image source unit 1 is a liquid crystal display panel unit. The optical sheet 10 forms a part of the image source unit 1.

The image source unit 1 includes: a backlight 2, a polarizing plate 3, a liquid crystal panel 4, a polarizing plate 5, an adhesive layer 6, and the optical sheet 10. These layers respectively extend on the front-to-back direction of the drawing sheet while maintaining the cross section shown in FIG. 3. Here, the optical sheet 10 is laminated on the observer side of the adhesive layer 6. Hereinafter, each layer will be described. The display device includes an electric circuit for operating the image source unit 1, and a power circuit.

The backlight 2 is a light source of the liquid crystal panel 4. A backlight to be used for a conventional liquid crystal display panel unit can be used. Examples the backlight include: a planar backlight in which light sources are substantially uniformly arranged in a plane and an edge type backlight in which a light source is disposed on the edge to eventually emit planar light by using a reflective surface.

The polarizing plates 3 and 5 are a pair of optical elements disposed so as to hold the liquid crystal panel 4 therebetween and absorb a polarized light having a vibrating face parallel to an absorption axis direction while having a function of transmitting the polarized light having a vibrating face perpendicular to the absorption axis direction. The light of the backlight 2 which has transmitted the polarizing plates 3 and 5 and the liquid crystal panel 4 becomes an image light and the image light is emitted to the observer side.

The liquid crystal panel 4 is one of the elements constituting the image source in the image source unit 1 and video information to be output is displayed on the liquid crystal panel 4. A liquid crystal panel to be used for a conventional liquid crystal display panel unit can be used. In the image source unit 1, an image source is formed by the backlight 2, the polarizing plates 3 and 5, and the liquid crystal panel 4.

The adhesive layer 6 is a layer on which an adhesive is placed to adhere the optical sheet 10 to the image source. As the adhesive to be used for the adhesive layer 6, the same adhesive as that of the adhesive layer 17 which has been described in the description of the optical sheet 10 can be used. The quality of the material is not particularly limited as long as it can transmit light and provide a suitable adhesion. For example, a pressure sensitive adhesive (PSA) maybe used. The viscosity is, for example, approximately several N/25 mm to 20N/25 mm.

A change in color depending on the angle for observing an image can be suppressed by the above-described image source unit 1. Hereinafter, a detailed description of the control will be given below, First, the optical sheet that does not contain the light diffusing material-containing layer will be considered. An example of an optical path is shown in FIG. 4. According to this configuration, an image light L1 including image lights L11, L12, and L13 is emitted to the observer side as follows. That is, the image light L11 which has entered the prisms is totally reflected at a point A of the interface between the prism and the light-absorbing portion and it becomes the image light L12. In the total reflection, since wavelength dispersion is caused by the difference of the refractive index due to the wavelength, the image light L12 includes the change in color depending on the observation angle. When the image light L12 reaches an interface B which is an emission face of the prisms and passes through the interface, the image light L12 becomes the image light L13. At the time of transmission through the interface 5, the refraction is caused by the refractive index difference between front and back interfaces. In the process, the wavelength dispersion is generated. Therefore, in this case, since the wavelength dispersion in the image light L12 is further increased by the image light L13, a change in color depending on the observation angle appears largely. The change in color is significant so that blueness increases, particularly as an angle to the normal line of the sheet is larger. Since the image light which has entered the prisms with an almost similar optical path adjacently follows the almost same optical path as that of the image light L1, the wavelength dispersion is caused in an almost similar way. Accordingly, the change in color depending on the observation angle is similar. Thus, the observer strongly senses the change in color.

Figure 5:
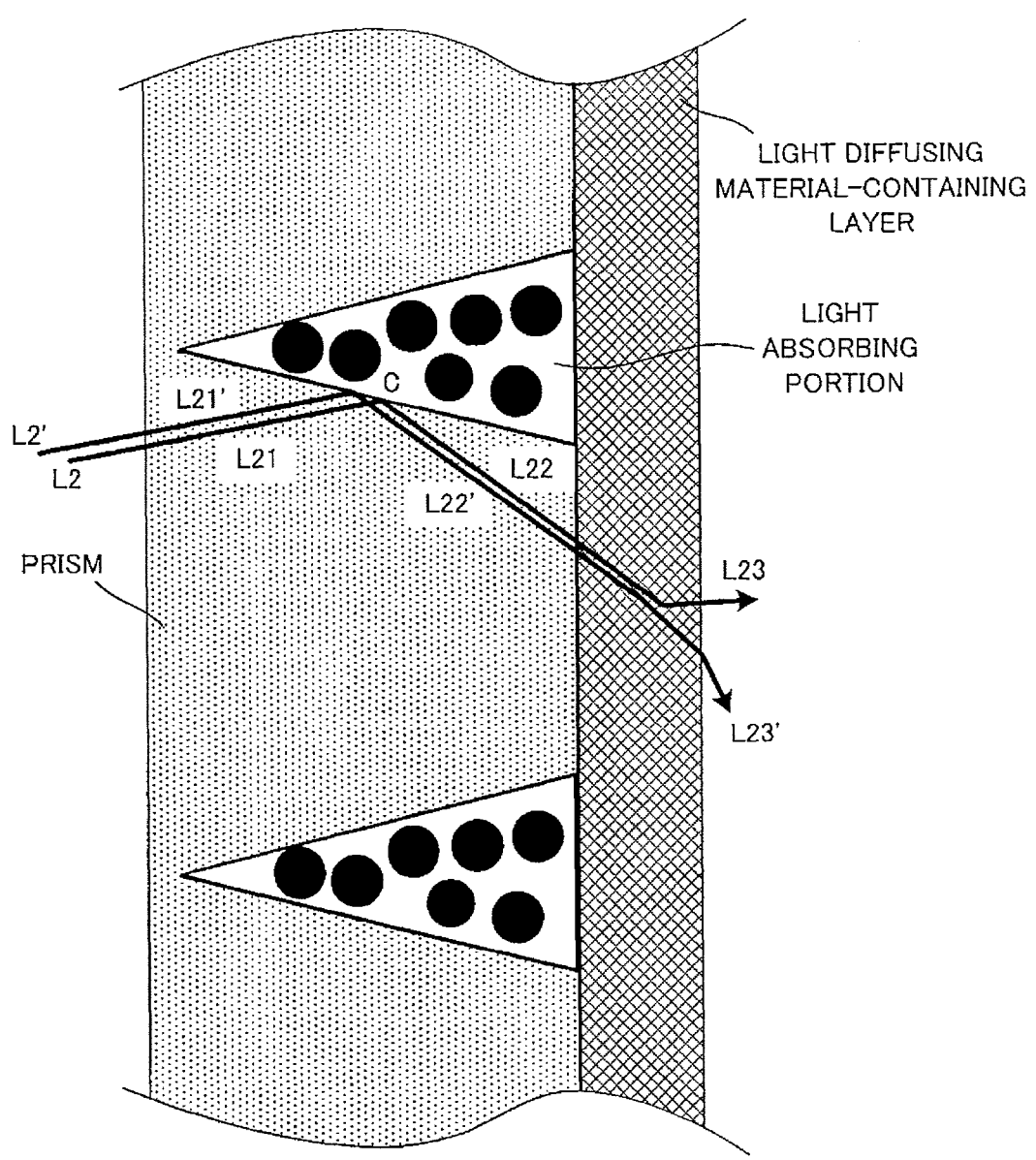
FIG. 5 is a view for illustrating an optical sheet in which a conventional light diffusing material-containing layer is provided.

Next, the case where the conventional light diffusing material-containing layer is laminated will be considered. An example of an optical path is shown in FIG. 5. As seen from this constitution, the image lights L2 and L2' are emitted to the observer side as follows. That is, image lights L21 and L21' which have entered the prisms in the almost same way are totally reflected at a point C of the interface between the prism and the light-absorbing portion and become image lights L22 and L22'. In the total reflection, since wavelength dispersion is caused by the difference of the refractive index due to the wavelength, the image lights L22 and L22' include the change in color depending on the observation angle. The image lights L22 and L22' pass through the emission face of the prisms and reach the light diffusing material-containing layer. As a result of the effect of the optical diffusing particles contained in the light diffusing material-containing layer, the optical paths of the image lights L22 and L22' are changed to different directions, respectively and the lights are diffused. Thus, even if the image lights L23 and L23' emitted to the observer side after the diffusion include wavelength dispersion, a predetermined wavelength is not easily concentrated only in one direction due to the diffused image light from the light diffusing material-containing layer. As a result, the observer is hardly aware of the change in color depending on the observation angle.

Figure 6:
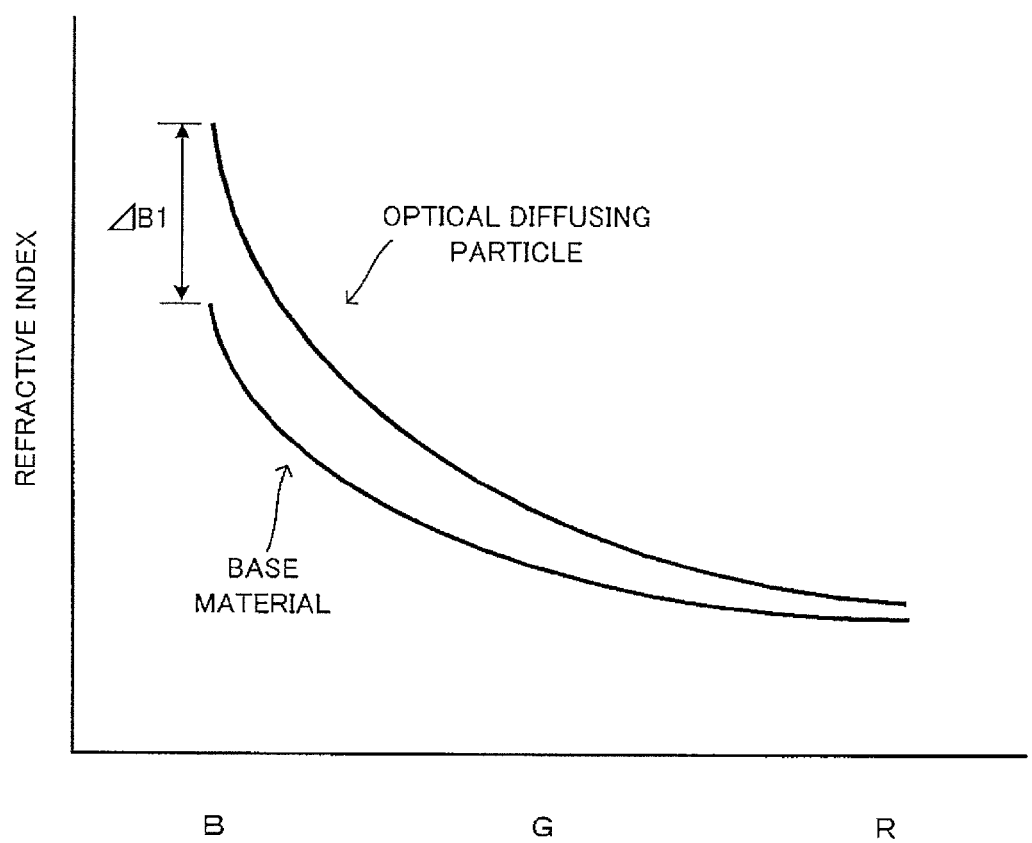
FIG. 6 is an exemplary graph for explaining the relationship between wavelengths R, G, and B of a conventional optical sheet and a refractive index.

However, in the conventional light diffusing material-containing layer, the change in color depending on the observation angle is noticed in some cases. This appears to be based on the following reasons. A graph for schematically illustrating the relation is shown in FIG. 6. FIG. 6 is a conceptual graph when the ordinate represents a refractive index and the abscissa represents: B (equivalent to blue wavelength), G (equivalent to green wavelength), and R (equivalent to red wavelength). That is, when the resin such as an acrylic/styrene resin is formed as the optical diffusing particles in the conventional manner, the Abbe number tends to become lower as the refractive index becomes higher. As shown in FIG. 6, since the difference between the refractive index of R and the refractive index of B in the optical diffusing particles becomes larger, the wavelength dispersion also becomes larger. In this case, the refractive index difference between the optical diffusing particles and the base material in B ($\Delta$B1) becomes the largest as compared to other wavelengths. Thus, in the diffusion of the light diffusing material-containing layer, the light, particularly in the blue region, is diffused largely and the light tends to proceed at a large angle to the direction of the normal line of the sheet. Although the effect of reducing the change in color by the light diffusing material-containing layer is provided, the effect is insufficient.

Figure 7:
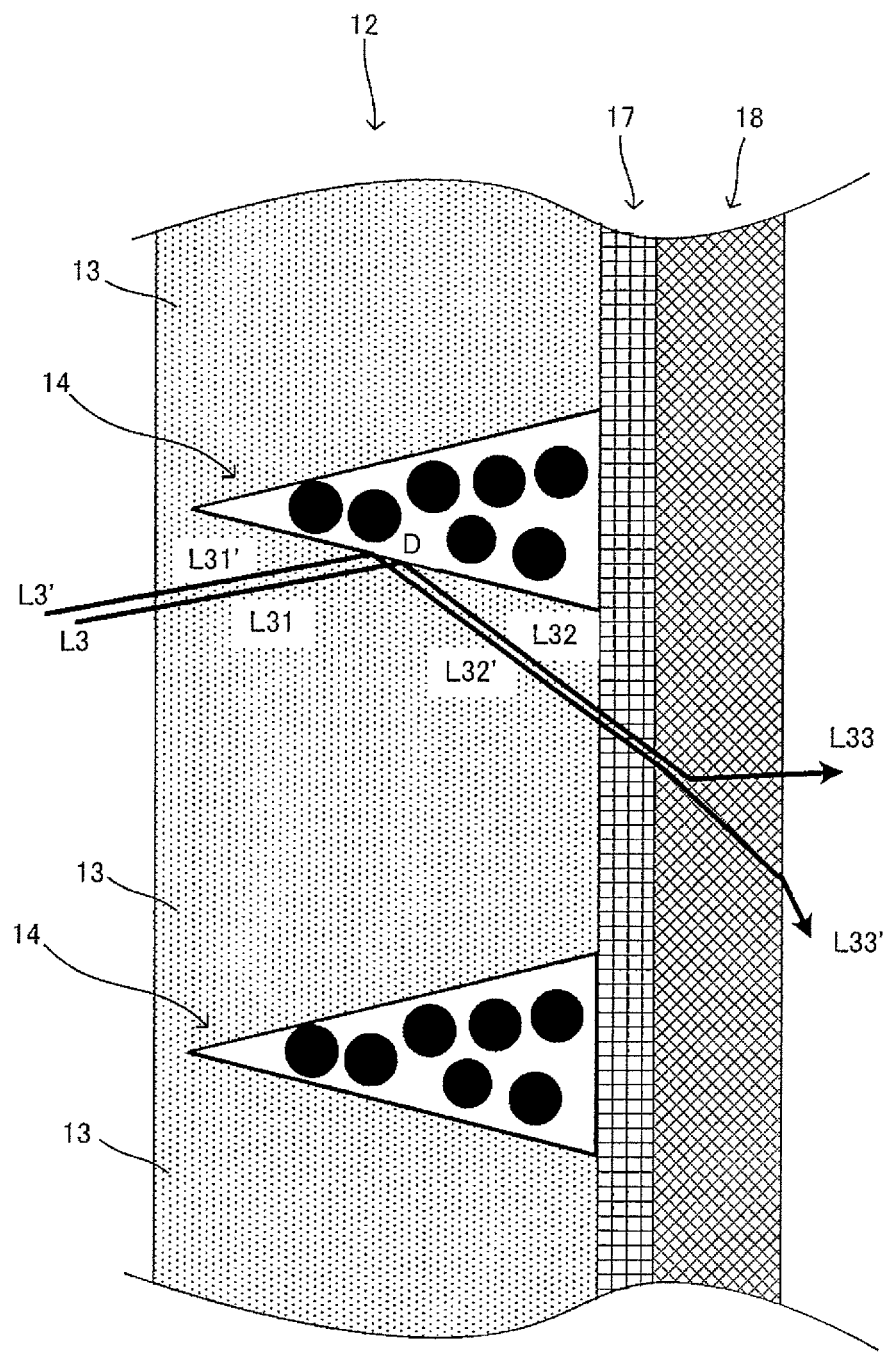
FIG. 7 is a view for explaining the optical sheet having the light diffusing material-containing layer in the embodiment shown in FIG. 3.

On the other hand, the display device having the image source unit 1 operates, for example, in the following manner. An example of an optical path is shown in FIG. 7. Image lights L3 and L3' are emitted to the observer side as follows. That is, the image lights L31 and L31' which has entered the prisms 13 in the almost same way are totally reflected at a point D of the interface between the prisms 13 and the light-absorbing portions 14 and they become image lights L32 and L32'. In this case, the interface is formed to have the angle $\theta$ with respect to the normal line of the sheet surface as described above, and thus the image lights L32 and L32' can emit image light in a direction for diffusion with respect to the image lights L31, 31'; whereby a large view angle can be obtained.

In the total reflection, since wavelength dispersion is caused by the difference of the refractive index due to the wavelength, the image lights L32 and L32' include the change in color depending on a little angles. The image lights L32 and L32' pass through the emission face of the prisms 13 and reach the light diffusing material-containing layer 18. As a result of the effect of the optical diffusing particles contained in the light diffusing material-containing layer, the optical paths of the image lights L32 and L32' are changed to different directions respectively, and the lights are diffused. Thus, even if the image lights L33 and L33' emitted to the observer side after the diffusion include wavelength dispersion, a predetermined wavelength is not easily concentrated only in one direction due to the diffused image light from the light diffusing material-containing layer. As a result, the observer is hardly aware of the change in color depending on the observation angle.

Figure 8:
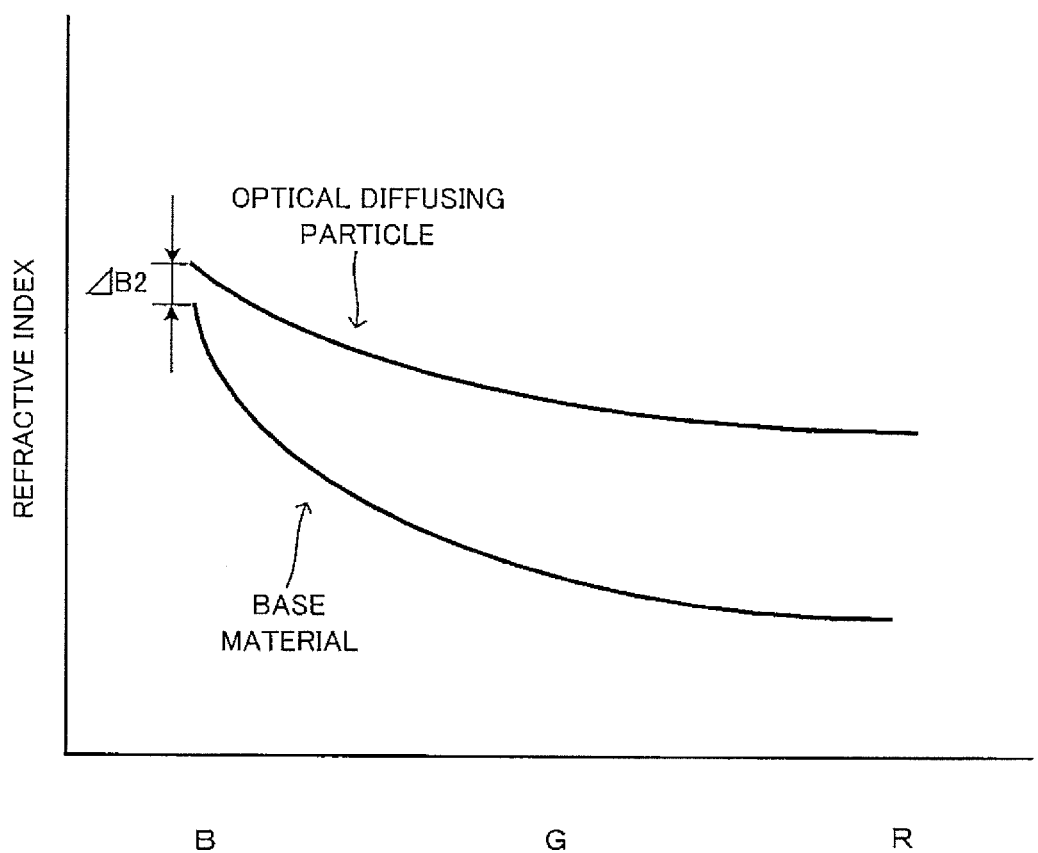
FIG. 8 is a graph for schematically illustrating the relationship between wavelengths R (red), G (green), and B (blue) of the optical sheet included in the embodiment of FIG. 3 and the refractive index.

In addition to this, the base material and the optical diffusing particles which are included in the light diffusing material-containing layer 18 are formed so as to have the above-described relation. Thus, the change in color caused depending on the observation angle in the related art can be further suppressed. This is considered to be based on the following reasons. A graph for schematically illustrating the relation is shown in FIG. 8. In the same manner as FIG. 6, FIG. 8 is a conceptual graph when the ordinate represents a refractive index and the abscissa represents: B (equivalent to blue wavelength), G (equivalent to green wavelength), and R (equivalent to red wavelength). That is, in the same manner as the light diffusing material-containing layer 18, when using a layer with the refractive index of the optical diffusing particle which is higher than that of the base material and having the higher Abbe number, the difference between the refractive index of R and the refractive index of B in the optical diffusing particles can be suppressed smaller and the wavelength dispersion becomes small. In this case, the refractive index difference between the optical diffusing particles and the base material in B (ΔB2) becomes the smallest as compared to other wavelengths.

As described above, when diffusing the light in the light diffusing material-containing layer 18, light in a blue region where the wavelength is short is not diffused largely. Combined with the effect of reduction of the color in change by the light diffusing material-containing layer 18, the change in color depending on the observation angle can be suppressed.

Figure 9:
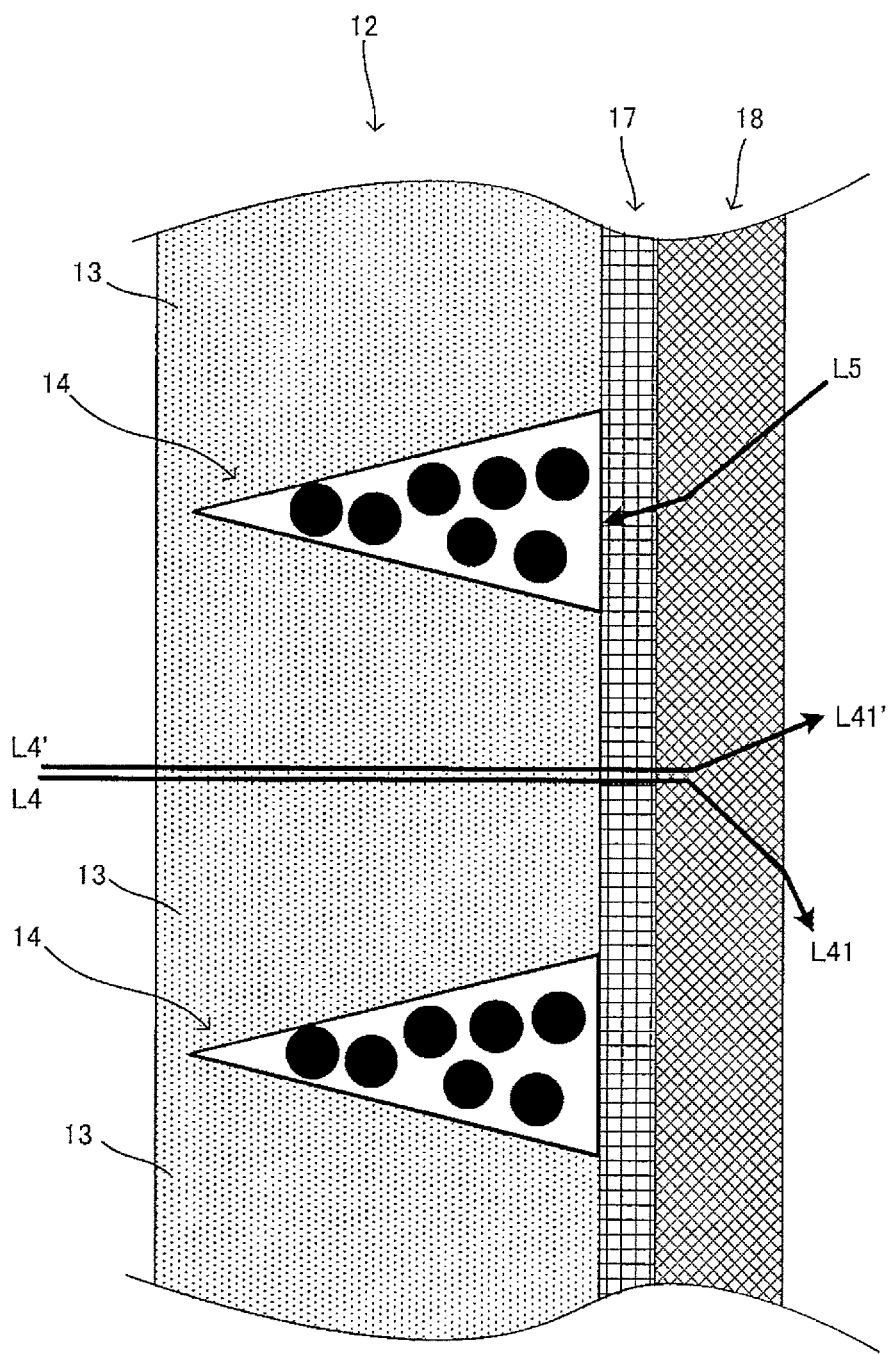
FIG. 9 is another view for illustrating the optical sheet having the light diffusing material-containing layer in the embodiment shown in FIG. 3.

Another example of the optical path is shown in FIG. 9. The emission directions of image lights L4 and L4' which pass through the prisms 13 without being reflected and absorbed in the light-absorbing portions 14 are also changed by the effect of the light diffusing material-containing layer 18. Thus, the image light is diffused. In this case, the change in color depending on the observation angle can be controlled in the same manner as that of the image lights L3 and L3'.

An external light L5 entered the display device as an external light enters the light-absorbing portion 14 and is absorbed therein. Accordingly, a part of the external light is absorbed in the light-absorbing portions 14, so that the contrast can be improved.

Figure 10:
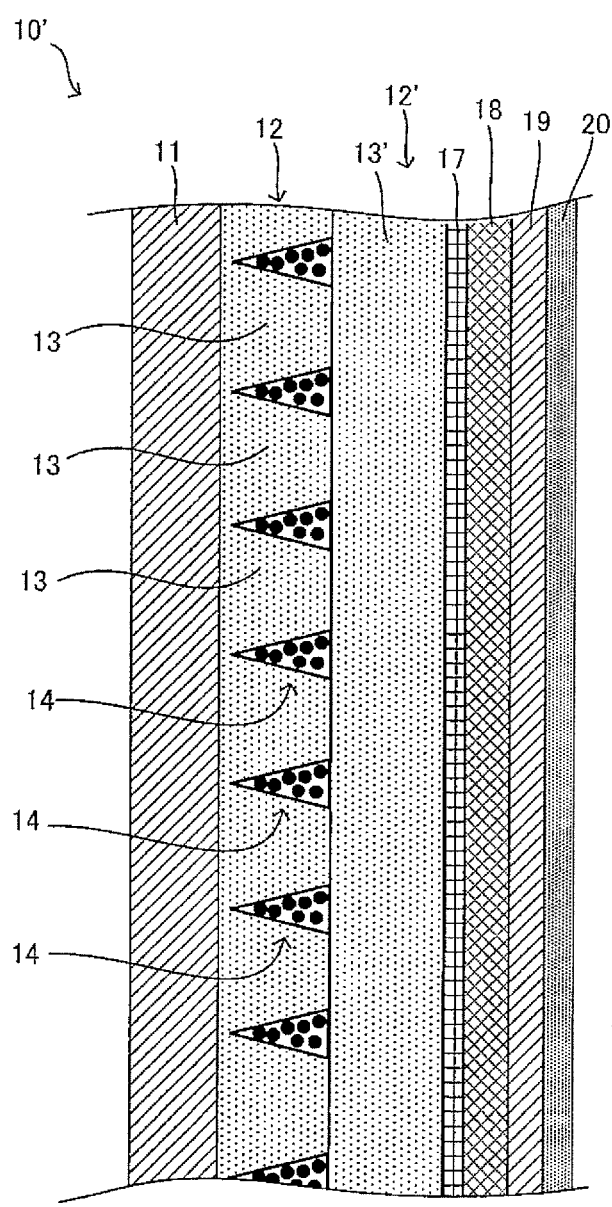
FIG. 10 is a view showing the cross section of an optical sheet according to a first modification of the optical sheet shown in FIG. 1 and schematically showing the layer structure of the optical sheet.

FIG. 10 is a cross-sectional view of the optical sheet 10 according to a first modification of the optical sheet and schematically shows the layer structure of the optical sheet 10'. In the optical sheet 10', another optical functional sheet layer 12' is laminated between the optical functional sheet layer 12 of the optical sheet 10 and the adhesive layer 17. The optical functional sheet layer 12' has the same structure as that of the optical functional sheet layer 12. The light-absorbing portions of the optical functional sheet layer 12' (only the prisms 13' are shown and the light-absorbing portions are not shown in FIG. 10) are disposed in a direction perpendicular to the light-absorbing portions 14 of the optical functional sheet layer 12. Thus, a direction in which the image light is diffused is extended, and further the light can be diffused in a wide range.

Figure 11:
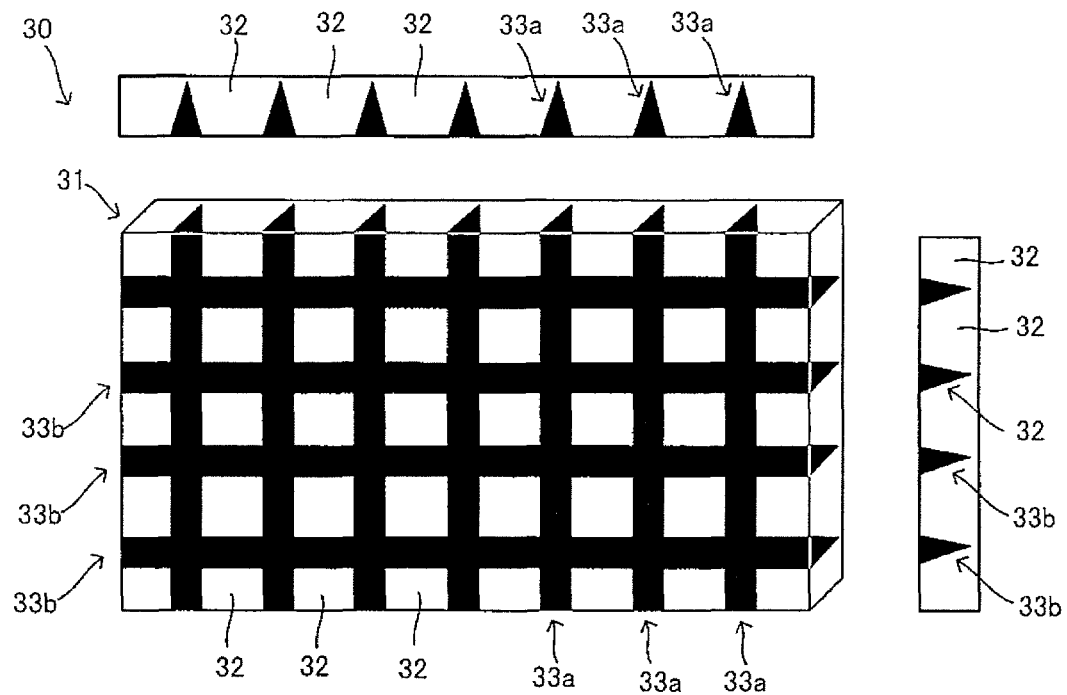
FIG. 11 is a view for illustrating an optical functional sheet layer of an optical sheet according to the second modification.

FIG. 11 is a perspective view schematically showing the structure of an optical functional sheet layer 31 in the optical sheet 30 according to a second modification. FIG. 11 show cross-sectional views at the top and right of the perspective view, respectively for ease of understanding. The components other than the optical functional sheet layer 31 is in common with those of the optical sheet 10, so their descriptions will be omitted here. In the perspective view of FIG. 11, the front side of the drawing sheet is the observer side and the backside of the drawing sheet is the light source side.

In the optical functional sheet layer 31 shown in FIG. 11, light-absorbing portions 33a and 33b having a triangular cross section are combined to form in a lattice shape. Individual regions surrounded by the lattices are prisms 32.

Although the cross sections of the light-absorbing portions 33a and 33b are triangular, they may be trapezoidal. In this case, the short upper base of the trapezoidal shape is disposed on the light source side and the long lower base of the trapezoidal shape is disposed on the observer side.

In the second modification, the light-absorbing portions are formed into a lattice shape in the optical functional sheet layer 31 of one sheet. The lattices are characterized by being almost perpendicular one another. When formed in this manner, a view angle can be extended horizontally and perpendicularly in the optical functional sheet layer 31 of one sheet. Therefore, the view angle can be extended in any direction while making the optical sheet thinner.

Figure 12:
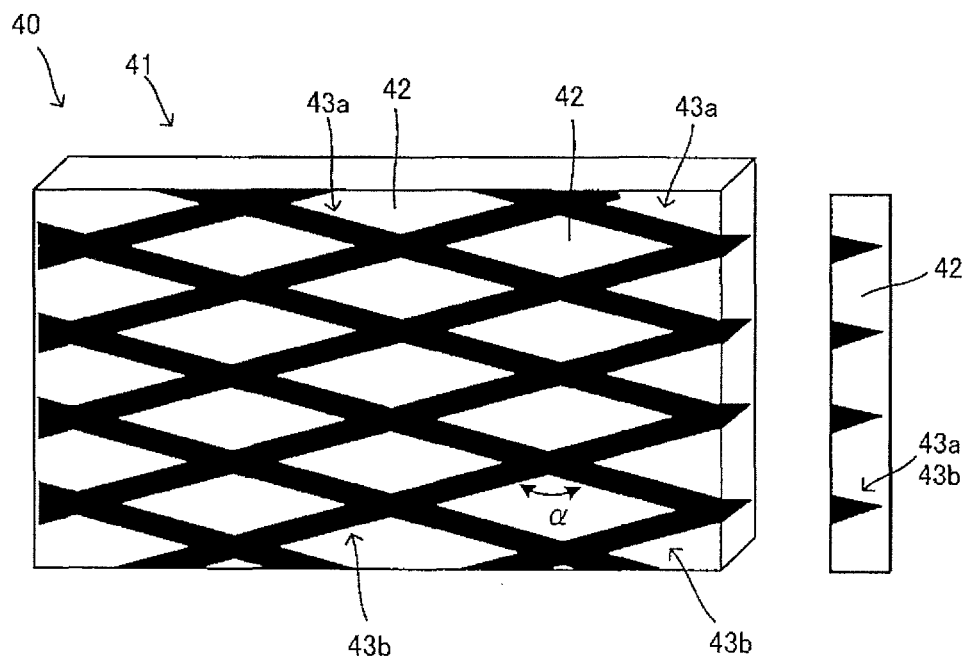
FIG. 12 is a view for illustrating an optical functional sheet layer of an optical sheet according to the third modification.

FIG. 12 is a perspective view schematically showing the structure of an optical functional sheet layer 41 in an optical sheet 40 according to a third modification. In FIG. 12, a cross-sectional view is shown at the right of the perspective view for ease of understanding. Since the components other than the optical functional sheet layer 41 are in common with those in the optical sheet 10, their descriptions will be omitted here. In the perspective view of FIG. 12, the front side of the drawing sheet is the observer side and the back side of the drawing sheet is the light source side.

In the optical functional sheet layer 41 shown in FIG. 12, light-absorbing portions 43a and 43b having a triangular cross section are combined to form in a lattice shape. Individual regions surrounded by the lattices are prisms 42.

Although the cross sections of the light-absorbing portions 43a and 43b are triangular, they may be trapezoidal. In this case, the short upper base of the trapezoidal shape is disposed on the light source side and the long lower base of the trapezoidal shape is disposed on the observer side.

In the third modification, the light-absorbing portions are also formed into a lattice shape in the optical functional sheet layer of one sheet. The lattices are characterized by crossing one another so as to have a predetermined angle α. Such formation can improve view angle characteristics with respect to the predetermined angle corresponding to the angle α.

Hereinafter, the invention will be described in more detail with examples. However, the present invention is not limited to the scope of the examples.

EXAMPLES

Example 1

As Example 1, the influence of the difference of the refractive indices and the difference of the Abbe number on the change in color depending on the observation angle was examined with two optical sheets (Nos. 1 and 2). As No. 1 (Example of the present invention), an optical sheet including a PET film layer (188 μm in thickness), an optical functional sheet layer (100 μm in thickness), an adhesive layer, a light diffusing material-containing layer (25 μm in thickness), a TAC film layer, and an AG layer was prepared. Here, the optical functional sheet layer has a prism pitch of 50 μm and the angle (θ) of the oblique side is 10°. The base material of the light diffusing material-containing layer is an acrylate resin; the refractive indexes and the Abbe number are shown in Table 1. The optical diffusing particles are glass beads. The quality of the material, the refractive indices, the average particle diameter, and the Abbe number are specifically shown in Table 1. The concentration of glass beads to the base material was set to 15 parts.

On the other hand, as No. 2 (Comparative example), the optical sheet having the same layer structure in which the conditions of the light diffusing material-containing layer were changed was prepared. The base material of the light diffusing material-containing layer of the optical sheet of No. 2 was the same as that of No. 1. The optical diffusing particles are resin beads. The material, the refractive indices, the average particle diameter, and the Abbe number are specifically shown in Table 1. The concentration of resin beads to the base material was set to 15 parts.

The test was visually performed with the optical sheets in Example and Comparative example laminated on the image source. Visual observation was performed at a position spaced by a predetermined distance from the center of a screen in the normal direction of the screen and at a position having an angle of 60 degrees from the normal line. Here, the predetermined distance was 3 times the length in a height direction of the screen. Main conditions and the visual results of the light diffusing material-containing layer are shown in Table 1. As a result of the visual observation, in comparison of the case of observation in the normal line direction with the case of observation at the 60-degree position, the case where the difference in color was controlled to be smaller was evaluated as "Good" (O) and the case where the difference in color was large was evaluated as "Bad" (X).

As is apparent from Table 1, the change in color depending on the observation angle could be suppressed smaller by using the optical sheet of the example of the present invention (No. 1) in which the refractive index of the optical diffusing particles and the Abbe number were larger than those of the base material.

This was examined in more detail in Examples 2 and 3.

Example 2

In Example 2, the influence of the refractive index difference between the base material and the optical diffusing particles was examined. The base material is the same as that of Example 1. The base material, conditions of the optical diffusing particles, and results of visual observation in the Example 2 (Nos. 3 to 5) are shown in Table 2. Here, the case evaluated as "relatively poor" ($\Delta$) means that the change in color depending on the observation angle could be suppressed smaller, but the degree of suppression was slightly lower than those in the other cases.

TABLE 1

| | | Light diffusing material-containing layer | | | | | | | |
|---|---|---|---|---|---|---|---|---|---|
| | | Base material | | | | | Optical diffusing particle | | |
| | | Refractive index | | | Abbe number | | | Refractive index | |
| No | Material | $Nf_K$ | $Nd_K$ | $Nc_K$ | $vd_K$ | Material | $Nf_R$ | $Nd_R$ | $Nc_R$ |
| 1 | Acrylic resin | 1.498 | 1.491 | 1.488 | 50.1 | Glass beads: EMB-10, manufactured by Potters-Ballotini Co., Ltd. | 1.521 | 1.516 | 1.512 |
| 2 | Acrylic resin | 1.498 | 1.491 | 1.488 | 50.1 | Technopolymer: MSX-12, manufactured by Sekisui Chemical Co., Ltd. | 1.529 | 1.520 | 1.517 |

| | Light diffusing material-containing layer | | | | | |
|---|---|---|---|---|---|---|
| | Optical diffusing particle | | | | | |
| No | Average particle diameter (μm) | Abbe number $vd_R$ | Refractive index difference $Nd_R - Nd_K$ | Abbe number difference $vd_R - vd_K$ | Visual Observation | |
| 1 | 5 | 60.7 | 0.025 | 10.6 | O | Example of the Present invention |
| 2 | 5 | 45.2 | 0.029 | −4.9 | X | Comparative example |

TABLE 2

| | | Light diffusing material-containing layer | | | | | | | |
|---|---|---|---|---|---|---|---|---|---|
| | | Base material | | | | | Optical diffusing particle | | |
| | | Refractive index | | | Abbe number | | Refractive index | | |
| No | Material | $Nf_K$ | $Nd_K$ | $Nc_K$ | $vd_K$ | Material | $Nf_R$ | $Nd_R$ | $Nc_R$ |
| 3 | Acrylic resin | 1.498 | 1.491 | 1.488 | 50.1 | Glass beads: EMB-10, manufactured by Potters-Ballotini Co., Ltd. | 1.521 | 1.516 | 1.512 |
| 4 | Acrylic resin | 1.498 | 1.491 | 1.488 | 50.1 | Glass beads (trial product) | 1.557 | 1.550 | 1.547 |
| 5 | Acrylic resin | 1.498 | 1.491 | 1.488 | 50.1 | Glass beads (trial product) | 1.492 | 1.487 | 1.485 |

| | Light diffusing material-containing layer | | | | | |
|---|---|---|---|---|---|---|
| | Optical diffusing particle | | | | | |
| No | Average particle diameter (μm) | Abbe number $vd_R$ | Refractive index difference $Nd_R - Nd_K$ | Abbe number difference $vd_R - vd_K$ | Visual Observation | |
| 3 | 5 | 60.7 | 0.025 | 10.6 | ○ | Example of the Present invention |
| 4 | 5 | 55.0 | 0.059 | 4.9 | Δ | Example of the Present invention |
| 5 | 5 | 70.4 | −0.004 | 20.3 | X | Comparative example |

As is apparent from Table 2, when the refractive index difference is 0 or less, the change in color depending on the observation angle was observed (No. 5). On the other hand, when the refractive index of the optical diffusing particles was larger than the refractive index of the base material and the Abbe number was also larger than the Abbe number of the base material, the change in color depending on the observation angle could be suppressed smaller.

As described above, when the refractive index difference is larger than 0.06, the optical diffusion effect is large. This results in reduction in the number of the optical diffusing particles for obtaining a predetermined light diffusing characteristic, which causes glare (scintillation).

Example 3

In Example 3, the influence of the particle diameter of the optical diffusing particles was examined. The base material is the same as that of Example 1. The base material, conditions of the optical diffusing particles, and visual results in the Example 3 (Nos. 6 to 10) are shown in Table 3. Here, the case evaluated as "relatively poor" (Δ) means that the change in color depending on the observation angle could be suppressed to be smaller, but the degree of suppression was slightly lower than those in the other cases.

TABLE 3

| | | Light diffusing material-containing layer | | | | | | | |
|---|---|---|---|---|---|---|---|---|---|
| | | Base material | | | | | Optical diffusing particle | | |
| | | Refractive index | | | Abbe number | | Refractive index | | |
| No | Material | $Nf_K$ | $Nd_K$ | $Nc_K$ | $vd_K$ | Material | $Nf_R$ | $Nd_R$ | $Nc_R$ |
| 6 | Acrylic resin | 1.498 | 1.491 | 1.488 | 50.1 | Glass beads: EMB-10, manufactured by Potters-Ballotini Co., Ltd. | 1.521 | 1.516 | 1.512 |
| 7 | Acrylic resin | 1.498 | 1.491 | 1.488 | 50.1 | Glass beads: EMB-20, manufactured by Potters-Ballotini Co., Ltd. | 1.521 | 1.516 | 1.512 |
| 8 | Acrylic resin | 1.498 | 1.491 | 1.488 | 50.1 | Glass beads (trial product) | 1.521 | 1.516 | 1.512 |

TABLE 3-continued

| No | | | | | | | Refractive index difference $Nd_R - Nd_K$ | Abbe number difference $vd_R - vd_K$ | | |
|---|---|---|---|---|---|---|---|---|---|---|
| 9 | Acrylic resin | 1.498 | 1.491 | 1.488 | 50.1 | Glass beads (trial product) | 1.521 | 1.516 | 1.512 |
| 10 | Acrylic resin | 1.498 | 1.491 | 1.488 | 50.1 | Glass beads (trial product) | 1.521 | 1.516 | 1.512 |

| | Light diffusing material-containing layer | | | | |
|---|---|---|---|---|---|
| | Optical diffusing particle | | | | |
| No | Average particle diameter (μm) | Abbe number $vd_R$ | Refractive index difference $Nd_R - Nd_K$ | Abbe number difference $vd_R - vd_K$ | Visual Observation |
| 6 | 5 | 60.7 | 0.025 | 10.6 | ○ | Example of the Present invention |
| 7 | 10 | 60.7 | 0.025 | 10.6 | ○ | Example of the Present invention |
| 8 | 16 | 60.7 | 0.025 | 10.6 | ○ | Example of the Present invention |
| 9 | 2 | 60.7 | 0.025 | 10.6 | Δ | Example of the Present invention |
| 10 | 18 | 60.7 | 0.025 | 10.6 | Δ | Example of the Present invention |

As is apparent from Table 3, when the refractive indexes and the Abbe number of the optical diffusing particles are larger than the refractive indexes and the Abbe number of the base material, the change in color depending on the observation angle can be suppressed smaller. However, the particle diameter of the optical diffusing particles is influenced depending on the degree.

The above has described the present invention associated with the most practical and preferred embodiments thereof. However, the invention is not limited to the embodiments disclosed in the specification. Thus, the invention can be appropriately varied as long as the variation is not contrary to the subject substance and conception of the invention which can be read out from the claims and the whole contents of the specification. It should be understood that optical sheets and display devices with such modifications are encompassed in the technical scope of the invention.

The invention claimed is:

1. An optical sheet comprising:
a plurality of layers,
at least one of the plurality of layers being an optical functional sheet layer which includes: prisms arranged in parallel along a surface of the optical sheet in such a way that light is transmittable; and light-absorbing portions arranged in parallel between the prisms in such a way as to absorb light,
at least another one of the layers being a light diffusing material-containing layer with optical diffusing particles dispersed in a sheet-shaped base material, and
the optical sheet satisfying a relation of $Nd_K < Nd_R$ and $10 \leq vd_R - vd_K \leq 30$, wherein $Nd_K$ is a refractive index of the base material of the light diffusing material-containing layer and $vd_K$ is an Abbe number thereof, $Nd_R$ is a refractive index of the optical diffusing particles and $vd_R$ is an Abbe number thereof.

2. The optical sheet according to claim 1, wherein a difference between the refractive indices $Nd_K$ and $Nd_R$ is 0.02 or more and 0.06 or less.

3. The optical sheet according to claim 1, wherein an average diameter of the optical diffusing particles contained in the light diffusing material-containing layer is 4 μm or more and 16 μm or less.

4. The optical sheet according to claim 1, wherein the base material of the light diffusing material-containing layer is made of an organic material and the optical diffusing particles are formed of an inorganic material.

5. The optical sheet according to claim 1, wherein a binder made of resin is filled in the light-absorbing portion of the optical functional sheet layer and light absorbing particles having an average diameter of 1 μm are dispersed in the binder.

6. The optical sheet according to claim 1, wherein the prisms of the optical functional sheet layer and the light-absorbing portion are formed to extend in a longitudinal direction while maintaining a predetermined cross section, two of the optical functional sheet layers are laminated so that a longitudinal direction of the light-absorbing portion of one of the optical functional sheet layers of the two optical functional sheet layers and a longitudinal direction of the light-absorbing portion of the other optical functional sheet layer of the two optical functional sheet layers have a predetermined angle.

7. The optical sheet according to claim 6, wherein the predetermined angle is 90 degrees.

8. The optical sheet according to claim 1, wherein the light-absorbing portion of the optical functional sheet layer is formed into a shape of lattices crossing at a predetermined angle.

9. The optical sheet according to claim 8, wherein the predetermined angle is 90 degrees.

10. The optical sheet according to claim 1, wherein the plurality of layers comprises at least one of a base material layer to be used as a base layer of the optical functional sheet layer, an adhesive layer, an antiglare film layer, and a triacetylcellulose film layer, in addition to the optical functional sheet layer and the light diffusing material-containing layer.

11. The optical sheet according to claim 1, wherein the plurality of layers comprise an anti-glare film layer in addition to the optical functional sheet layer and the light diffusing material-containing layer, and the light diffusing material-containing layer is provided between the optical functional sheet layer and the antiglare film layer.

12. The optical sheet according to claim 1, wherein the light diffusing material-containing layer has an anti-glare function.

13. A display device comprising the optical sheet according to claim 1.

14. An optical sheet comprising:
a plurality of layers,
at least one of the plurality of layers being an optical functional sheet layer which includes: prisms arranged in parallel along a surface of the optical sheet in such a way that light is transmittable; and light-absorbing portions arranged in parallel between the prisms in such a way as to absorb light,
at least another one of the layers being a light diffusing material-containing layer with optical diffusing particles dispersed in a sheet-shaped base material, and
the optical sheet satisfying a relation of $Nd_K < Nd_R$ and $4.9 \leq vd_R - vd_K \leq 10.6$, wherein $Nd_K$ is a refractive index of the base material of the light diffusing material-containing layer and $vd_K$ is an Abbe number thereof, $Nd_R$ is a refractive index of the optical diffusing particles and $vd_R$ is an Abbe number thereof.

15. The optical sheet according to claim 14, wherein a difference between the refractive indicies $Nd_K$ and $Nd_R$ is 0.02 or more and 0.06 or less.

\* \* \* \* \*